3,560,529
POLYMERIZATION OF ITACONIC ANHYDRIDE
John H. Blumbergs, Highland Park, and Donald G. MacKellar, Trenton, N.J., assignors to FMC Corporation, New York, N.Y., a corporation of Delaware
No Drawing. Filed Sept. 10, 1968, Ser. No. 758,669
Int. Cl. C08f 7/12
U.S. Cl. 260—346.8                      4 Claims

ABSTRACT OF THE DISCLOSURE

Itaconic anhydride is homopolymerized by heating said anhydride at a temperature of at least about 70° C. in the presence of an initiating amount of a mixed itaconic-acyl peroxide.

---

Itaconic anhydride is homopolymerized by heating said anhydride at a temperature of at least about 70° C. in the presence of an initating amount of a mixed itaconic-acyl peroxide.

BACKGROUND OF THE INVENTION (A) Field of the invention

This invention relates to homopolymers of itaconic anhydride and particularly with a method for initiating the formation of such homopolymers.

(B) Description of the prior art

It is reported that itaconic anhydride can be homopolymerized to form polymers having molecular weights of from about 350 to about 1,500,000 and preferably 500 to about 175,000. Homopolymers of itaconic anhydride and especially the derivatives thereof, e.g., polymerized itaconic acid and water-soluble salts thereof, have been reported to be effective as builders in detergent formulations in U.S. Pat. 3,308,067 issued to Francis Diehl on Mar. 7, 1967. They are also useful as additives to polymer systems and in the surface treatment of metals.

However, the homopolymerization of itaconic anhydride, from which itaconic acid and its salt are obtained, is difficult to initiate, and special polymerization techniques must be employed to obtain a satisfactory product. While certain additives, such as acetyl peroxide, or special processing techniques, such as using high pressures, have been suggested to initiate polymerization of anhydrides, these have serious drawbacks in commercial operations. Initially, the use of acetyl peroxide as a polymerization inhibitor has as its main drawback that this compound is shock-sensitive and can be detonated by rough handling or by being dropped. This is most serious because it means that one of the essential ingredients used in the synthesis must be handled with great care to avoid detonatinng the shock-sensitive acetyl peroxide.

Another drawback to the us of acetyl peroxide is that, at present, it is commercially available only as a solution in dimethyl phthalate. The dimethyl phthalate solvent accordingly must be added along with the acetyl peroxide to the itaconic anhydride compound, and the dimethyl phthalate contaminates the final product. To remove the dimethyl phthalate, an expensive organic solvent procedure is required to isolate the product from the dimethyl phthalate.

While this is of no moment in the small scale laboratory preparation of poly(itaconic anhydride), it poses a major problem to utilization of this process. In the plant operation the dimethyl phthalate solvent must be separate from the acetyl peroxide or from the final poly(itaconic anhydride) product.

Other known procedures for initiating homopolymerization of anhydrides, such as the use of high pressures, is not desirable in commercial operation, since it would require specialized, costly equipment built to withstand the high pressures necessary to initiate polymerization reaction. This specialized, expensive equipment would increase materially the capital cost of operating such a process. As a result, the art is in need of a more simplified, workable system for homopolymerizing itaconic anhydride without hazardous compounds.

OBJECTS OF THE INVENTION

It is an object of the present invention to initiate the homopolymerization of itaconic anhydride by a method which readily converts the itaconic anhydride to poly (itaconic anhydride) in high yields.

It is a further object to initiate the homopolymerization tion of itaconic anhydride by carrying out the polymerization in the presence of an initiator which is not detonable and therefore permits a completely safe operation.

It is still a further object of the present invention to initiate the homopolymerization of itaconic anhydride by means of an initiator which can be operated under ambient pressures and under mild conditions without requiring the use of superatmospheric, pressurized vessels.

These and other objects will be apparent from the foregoing disclosure.

SUMMARY OF THE INVENTION

We have now found that itaconic anhydride can be homopolymerized by heating said itaconic anhydride to a temperature of at least about 70° C. in the presence of an initiating amount of a mixed itaconic-acyl peroxide, having the structure:

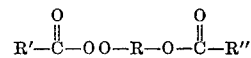

or

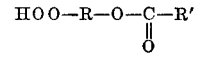

where R is

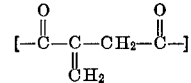

and where R' and R" may be an aliphatic or cycloaliphatic group containing up to 6 carbon atoms, or a phenyl group, and R" may be the same or a different group as R'.

DESCRIPTION OF THE INVENTION AND THE PREFERRED EMBODIMENTS

In carrying out the present invention, the mixed itaconic-acyl peroxide initiator is first prepared. A preferred method for preparing these mixed itaconic-acyl peroxides is as follows. Itaconic anhydride is first melted at above about 70° C. either in the presence of a solvent or in the absence of one. Hydrogen peroxide is then added to the melted itaconic anhydride. The peroxide immediately reacts with the itaconic anhydride to form peritaconic acid in substantially quantitative yields. This reaction is set forth in the equation below:

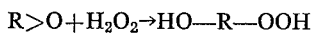

where R is

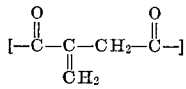

To the peritaconic acid is then added an acylating agent, normally a carboxylic acid anhydride. The anhydride in turn reacts with the peritaconic acid to form a mixed itaconic-acyl peroxide. A typical reaction using acetic anhydride as the acylating agent is set forth below:

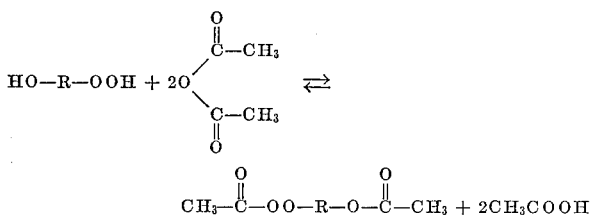

where R is

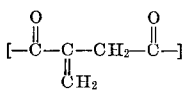

The acylation agent may be a carboxylic acid anhydride, such as acetic anhydride, benzoic acid anhydride, propionic acid anhydride, hexanoic acid anhydride and cyclohexane carboxylic acid anhydrides. Ketene can also be used as an acylating agent.

When using one mole of ketene per mole of peritaconic acid, a monoacetylated product is obtained, which serves as the initiator for homopolymerization of itaconic anhydride. This reaction is shown below:

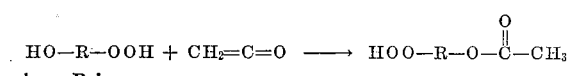

where R is

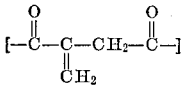

Two moles of ketene will give a diacetylated product as shown below:

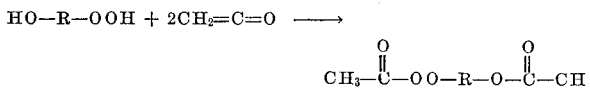

where R is

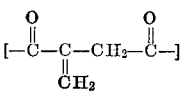

The carboxylic acid anhydrides useful as acylating agents may be symmetrical as shown above, or they may be unsymmetrical, i.e., mixed carboxylic acid anhydrides. These include formyl-acetic anhydride, benzoyl-acetic anhydride, propionyl-acetic anhydride and cyclohexane carbonyl-acetic anhydride.

The acyl residue of the above-described itaconic-acyl peroxides may be either unsubstituted or substituted with groups such as halogens, $NO_2$ $C\equiv N$ or methoxy or ethoxy groups. These may include itaconic-trifluoro-acetic, itaconic-trichloro-acetic, itaconic-monochloro-acetic, itaconic-p-nitrobenzoic, itaconic-cyanobenzoic and itaconic-methoxybenzoic peroxides. Additionally, phenyl residues likewise can be substituted with lower aliphatic groups having from 1-6 carbon atoms, e.g., isopropyl benzoyl-acetic anhydride.

In carrying out the polymerization procedure, the itaconic anhydride is melted at above about 70° C. in the presence of the above-defined, mixed itaconic-acyl peroxide and the reaction permitted to take place at a temperature between 70° and 95° C. Since the reaction is exothermic at least during the initial reaction period, heat exchange means should be used to maintain the temperature within the desired limits. Usually, polymerization is completed within 2 to 3 hours.

The polymerization can take place by the so-called "neat" polymerization in which only the itaconic anhydride and the mixed itaconic-acyl peroxide are reacted together without a solvent; alternately, the reaction can be carried out in the presence of a suitable solvent which is non reactive with the peroxide initiators, itaconic anhydride, or the final polymerized product. Among the suitable solvents are benzene, chlorobenzene, o-dichlorobenzene, alkyl acetates such as butylacetate, isopropylacetate and the like. The solvent should have a boiling point of at least about 70° C.

In carrying out the present polymerization reaction, the mixed itaconic-acyl peroxide must be present in initiating amounts. Normally, amounts as low as about 2% by weight of the mixed itaconic-acyl peroxide, based on the weight of the itaconic anhydride present, are sufficient to initiate the reaction. However, larger amounts may be used, and, in fact, are desirable to assure the ready initiation of the polyitaconic anhydride polymerization reaction. Obviously, the exact initiating amount of the mixed itaconic-acyl peroxide will vary, depending upon the acyl group which is employed in making up the peroxide.

A procedure of the present invention is to add the desired amount of itaconic anhydride for reaction to a vessel, with or without a solvent, heat it to at least 70° C. and subsequently add hydrogen peroxide in amounts sufficient to react with a portion of the itaconic anhydride. Normally, the amount of hydrogen peroxide used is at least about 0.2% by weight of the itaconic anhydride starting material. Obviously, higher amounts of hydrogen peroxide can also be employed. The added hydrogen peroxide then reacts with a stoichiometric amount of itaconic anhydride to form peritaconic acid. The resulting peritaconic acid which is formed does not act as a polymerization initiator, per se. At least a stoichiometric amount of an acylating agent is then added to the itaconic anhydride. The acylating agent reacts with the peritaconic acid to form the mixed itaconic-acyl peroxide. Thereafter, the mixed itaconic-acyl peroxide commences initiating the homopolymerization of the itaconic anhydride at temperatures of 70° C. and above. The resulting poly(itaconic anhydride) may have a molecular weight ranging anywhere from 350 to 1,500,000.

Normally, a slight excess of acylating agent can be employed over the stoichiometric amount necessary to react with the peritaconic acid in order to assure obtaining high yields of the mixed itaconic-acyl peroxide compound which acts as the initiator.

Purification of the resulting poly(itaconic anhydride) is easily accomplished by distilling the resulting product under reduced pressure to remove volatiles. Among the volatiles removed are the acyl acid corresponding to the acylating agent employed in producing the mixed itaconic acyl peroxide in the presence of the itaconic anhydride. The resulting poly(itaconic anhydride) produced by the invention is readily soluble in nonreactive solvents such as water, acetone, tetrahydrofuran, 1,2-dimethoxyethane, alkyl acetates, methylethyl ketone, dioxane and others.

When the poly(itaconic anhydride) is dissolved in water, it converts to the poly(itaconic acid). Metallic salts of the resulting poly(itaconic acid) can be produced by well-known acid-salt conversion reactions. One simple method for producing such salts is carried out by dissolving the poly(itaconic anhydride) in water at about 100° C., neutralizing the resulting aqueous poly(itaconic acid) with an alkali solution, e.g., NaOH, up to a pH of 10.0; the resulting solution is heated for a period of 3 to 4 hours. Upon readjusting the pH to about 10.0, a solid alkali metal (salt) is obtained and can be recovered by stripping off the water.

EXAMPLE 1

Run A—Process of the invention

In a 100 ml., three-neck reaction flask, equipped with a laboratory stirrer and condenser, there were placed 25 g. of itaconic anhydride. The flask was heated on a hot water bath to a temperature of 70–80° C. until all the itaconic anhydride had melted. The stirrer was then started and 10 drops of 90% hydrogen peroxide were added over a period of 5 minutes. The reaction mixture was maintained at 75–80° C. for an additional 30 minutes, and then 5 ml. of acetic anhydride were added. Shortly thereafter, a polymerization reaction began which was exothermic, and a cold water bath was used surrounding the reaction flask to maintain the temperature of the reaction mixture at 95–110° C. After reacting the mixture for about 25 minutes, the rate of polymerization decreased, and hot water had to be added to the bath to maintain the temperature of the reaction mixture at about 100° C. for an additional 2 hours until the polymerization was complete. Hot water was then added to dissolve the reaction mixture. Thereafter, the reaction flask was connected to a vacuum system and the major portion of the by-product acetic acid and water was removed by distillation under reduced pressure. The addition of water to the itaconic anhydride polymer hydrolyzes the anhydride groups to poly(itaconic acid). A pale yellow solid weighing 28 g. was recovered and identified as poly(itaconic acid.) The yield was 96.6% of theory, based on the itaconic anhydride starting reagent was recovered un-

Run B—Process in which the acyl anhydride is omitted

The same procedure was repeated as set forth in Run A, except that the acetic anhydride was omitted. After maintaining the reaction mixture for 6 hours at 95° C., no polymerization was obtained. About 95% of the itaconic anhydride starting reagent was recovered unreacted.

This example demonstrates the inability of peritaconic acid, formed by reaction of the added hydrogen peroxide and a portion of the itaconic anhydride, to intate polymerization of the itaconic anhydride.

EXAMPLE 2

The process of Example 1, Run A, was repeated except that in place of the acetic anhydride equivalent amounts of the acid anhydrides listed in Table I were used. The yield of poly(itaconic acid) is also set forth in Table I based on the itaconic anhydride feed.

TABLE I

| Acid anhydride: | Percent yield poly(itaconic acid) |
|---|---|
| Propionic | 94.3 |
| Benzoic | 91.0 |
| Cyclohexane carboxylic | 92.0 |
| Trichloroacetic | 97.0 |
| Trifluoroacetic | 97.0 |

EXAMPLE 3

Process of the invention using ketene

Run A.—A 100 ml., three-neck reaction flask, supplied with a laboratory stirrer and condenser, similar to that used in Example 1, Run A, was charged with 70 g. of itaconic anhydride. The flask was heated in a hot water bath until the temperature of the itaconic anhydride was about 75° C. and had completely melted. The stirrer was then activated, and 1.0 g. of 90% $H_2O_2$ was added. The reaction mixture was maintained at 75° C. for an additional 10 minutes, and 2.5 g. of ketene gas were then added to the vessel. The ketene gas was produced by pyrolysis of acetone as described in detail J. Org. Chem. 5, 122 (1940). The ketene gas was introduced through a 6 mm. glass inlet tube at a flow rate of 0.01 mole/minute for 6 minutes. The reaction mixture was stirred for an additional 5 minutes and then nitrogen was bubbled through it to remove methane gas from the flask which is produced as a by-product during the pyrolysis of the acetone. The reaction mixture was maintained at 75°–100° C. for 3 hours. The product was isolated in the same manner as has been set forth in Example 1, Run A, and 78 g. of crude poly(itaconic acid) were recovered. The yield was 96% of theoretical, based on the itaconic feed.

Run B.—The process of Run A was repeated except that 1.3 g. of ketene were used instead of 2.5 g. The polymerization proceeded smoothly, giving 94% yields of poly(itaconic acid), based on the itaconic feed.

EXAMPLE 4

Several mixtures of carboxylic acid anhydrides were prepared by reacting the corresponding carboxylic acids with ketene as described in detail by R. E. Dunbar and F. C. Garven in Journal of the American Chemical Society, 77, pp. 4161–2, 1955. These mixed carboxylic-acetic anhydrides were added in place of the acetic anhydride as the acylating agent following the procedure set forth in Example 1, Run A. The results are listed in Table II.

TABLE II

| Mixed anhydride acylating agent | Grams used | Grams poly-itaconic acid obtained | Percent yield |
|---|---|---|---|
| Benzoic-acetic | 5.0 | 26.2 | 90 |
| Formic-acetic | 4.0 | 22.0 | 76 |
| Trichloroacetic-acetic | 8.0 | 27.0 | 93 |
| m-Chlorobenzoic-acetic | 8.0 | 25.0 | 86 |
| Cyclohexylcarboxylic-acetic | 7.0 | 25.6 | 88 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for homopolymerizing itaconic anhydride which comprises heating said itaconic anhydride to a temperature of at least about 70° C. in the presence of an initiating amount of a mixed itaconic-acyl peroxide, selected from the class of compounds having the structure:

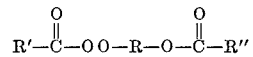

and

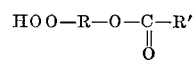

where R is

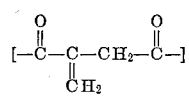

and where R' and R'' may be an aliphatic or cycloaliphatic group containing up to 6 carbon atoms, or a phenyl group.

2. Process of claim 1 in which the itaconic anhydride is homopolymerized at temperatures of from about 75° C. to 100° C. in the presence of at least about 2% by weight of said mixed itaconic-acyl peroxide.

3. Process of homopolymerizing itaconic anhydride which comprises melting itaconic anhydride at a temperature of at least about 70° C., adding to said itaconic anhydride from about 0.5 to 2% by weight of hydrogen peroxide, thereafter adding a member selected from the group consisting of ketene and an acyl anhydride corresponding to the mixed itaconic-acyl peroxide desired, forming a mixed itaconic-acyl peroxide and continuing to heat the remainder of the itaconic anhydride in the presence of said itaconic-acyl peroxide at a temperture of from about 75° C. to about 100° C. to form poly(itaconic anhydride).

4. Process of claim 3 wherein said poly(itaconic anhydride) is reacted with water to form poly(itaconic acid).

References Cited

UNITED STATES PATENTS 3,474,114  10/1969  Kuhlkamp et al. ____ 260—347.3

ALEX MAZEL, Primary Examiner

B. I. DENTZ, Assistant Examiner

U.S. Cl. X.R.

260——546